United States Patent Office 3,066,072
Patented Nov. 27, 1962

3,066,072
EXTRACT FROM LIQUORICE ROOT HAVING ANTI-INFLAMMATORY ACTIVITIES
Siegfried Gottfried, Ilford, and Lily Baxendale, London, England, assignors to Biorex Laboratories Limited, London, England, a corporation of the United Kingdom
No Drawing. Filed June 18, 1958, Ser. No. 742,706
Claims priority, application Great Britain June 27, 1957
16 Claims. (Cl. 167—55)

This invention comprises new compounds obtainable from liquorice root, processes for their preparation and compositions containing such new compounds and having anti-inflammatory activity.

The new compounds provided according to the invention may be obtained from liquorice root by any of the methods hereinafter more particularly described. For instance a new compound, for which the name "xanthoglabrol" is suggested, may be prepared from the glacial acetic acid mother liquor remaining after crystallisation of the crude potassium salt of glycyrrhizin prepared from liquorice root.

More particularly, the mother liquor referred to in the preceding paragraph is treated with ether or another non-hydroxylic organic solvent so as to form a precipitate which is freed from solvent and then stirred with warm concentrated hydrochloric acid. Subsequent addition of water to the suspension so obtained causes precipitation and the total resulting solid, after being collected and dried, is extracted with ether. Removal of the ether by distillation leaves the new compound "xanthoglabrol" (containing a little glycyrrhetinic acid) as an orange solid.

Xanthoglabrol is present as an ether-insoluble glycoside in liquorice root. It is possible, of course, to obtain xanthoglabrol by processes other than that which has already been described, for instance by heating powdered liquorice root with concentrated hydrochloric acid and extracting the resulting water-insoluble mixture with ether to give a crude xanthoglabrol-glycyrrhetinic acid mixture. This method appears to be rather simpler than the former method. An alternative method is by the use of suitable enzymes.

Xanthoglabrol may be purified by absorption or partition chromatography and may be separated from glycyrrhetinic acid by treatment with cold ether, in which the xanthoglabrol is soluble, but the glycyrrhetinic acid is only sparingly soluble.

Pharmacological tests which have been carried out using rats, mice, guinea-pigs, rabbits and cats have shown xanthoglabrol to be an active anti-inflammatory agent, for example as is more particularly described below:

It heals artificial lesions produced on the skin of rabbits, whether from an external cause, or from intradermal injections of irritant substances. When applied locally, it causes rapid subsidence of any inflammation produced by the introduction of irritant substances into the eye of the rabbit.

When applied by systemic injection or by oral administration, it depresses the formation of granuloma tissue induced by subcutaneously-implanted cotton wool pellets in rats in the test described by Meier, R., Schuler, W., and Dessulles, P., Experientia, 1950, 6, 469. It depresses the formation of inflammatory exudate and of the granulomatous membrane in the granuloma pouch test described by Selye, H., Brit. Med. J., 1949, 2, 1129.

When injected systemically into B.C.G.-infected guinea-pigs, it suppresses the reaction to intradermally-injected tuberculin in the test described by Long, D. A., and Miles, A. A., Lancet, 1950, 1, 492.

In addition, when injected parenterally or administered orally, it has a mild depressant action in mice and potentiates the actions of central nervous system depressant drugs, such as hexobarbitone. It has mild analgesic and antipyretic actions.

This compound is of value in combating inflammatory conditions of all types, such as inflammatory conditions of the skin, eye, ears, nose, mouth dental cavities, and of genitals, rheumatic conditions, and other conditions where an inflammatory process is the primary or secondary cause or the result of such cause.

It has a potentiating effect demonstrating synergism with analgesics, antibiotic drugs (such as neomycin), keratoplastic drugs (such as coal tar), keratolytic drugs (such as salicyclic acid) antiseptics, bacteriocides, chemotherapeutics, bacteriostatics, fungicides, corticosteroids and insecticides.

It will be understood therefore, that xanthoglabrol is of value when applied therapeutically alone or with other therapeutic and pharmaceutical compositions, e.g. suitable carriers, colouring materials and other therapeutic agents, for instance those with which it shows a synergistic effect as has been already described.

In addition to xanthoglabrol itself, there are provided, according to the invention, its derivatives, for example the acyl derivatives, esters and salts, including salts of organic bases such as the piperazine, protamine, purine and N-methyl-glucamine salts as well as the sodium salt. The acetyl derivative and the sodium salt of xanthoglabrol are particularly suitable therapeutically, and have similar pharmacological properties to those of xanthoglabrol which have been described above. Further, xanthoglabrol in alkaline solution will couple with diazo compounds to give reddish azo-dyes.

The following examples are given for the purpose of illustrating the invention.

Example 1

Crude potassium glycyrrhizinate was prepared from liquorice root by the method of Ruzicka and Leuenberger (Helvetica Chimica Acta, 1936, 19, 1402). 250 grams of the crude salt were dissolved in 1250 cc. of boiling glacial acetic acid and, after allowing the solution to stand for several days, the resulting light-brown crystalline precipitate (about 102 grams) was filtered off, and ether was added to the mother liquor to precipitate further material until no further precipitation occurred. The total precipitate was filtered off and washed with ether and dried in a vacuum over concentrated sulphuric acid. The resulting solid (about 120 grams) was stirred at 50–55° C. with 600 cc. of concentrated hydrochloric acid for 20 minutes, water was then added, and the solid precipitate obtained (crude xanthoglabrol) was filtered off and dried at 100° C. (about 50 grams). It was extracted in a Soxhlet apparatus with ether until the extracts were colourless. Removal of the ether by distillation and evaporation gave xanthoglabrol (in a fairly pure state but still containing a little glycyrrhetinic acid) as an orange solid (about 32 grams).

Digestion of this product with about ten parts by weight of cold ether gave a solution from which glycyrrhetinic acid soon separated and was filtered off. Chromatography provides an alternative method of purification of the crude xanthoglabrol.

Crystallisation of the crude potassium glycyrrhizinate was found to be considerably accelerated if 90% acetic acid was used instead of glacial acetic acid.

Example 2

Powdered liquorice root (*Pulv. glycyrrhizae* B.P.) (10.0 grams) was digested, with stirring, in concentrated hydrochloric acid (70 cc.) to give a dark red-brown solution which was heated for 30 minutes at 50–55° C. and then poured into 500 cc. of water. The red-black precipitate obtained was filtered off, washed with water, and extracted with ether. The resulting crude xanthoglabrol, containing a little glycyrrhetinic acid, weighed 0.25 gram, i.e. about 2.5% of the original liquorice root. The xanthoglabrol can be purified further as described in Example 1, or by chromatography as indicated therein.

*Example 3*

Some of the xanthoglabrol obtained according to the process described in Example 1, was converted into its acetyl derivative by treatment with acetic anhydride in dry pyridine solution.

*Example 4*

An ethereal solution of the xanthoglabrol obtained according to the process described in Example 1 was shaken with successive portions of dilute aqueous sodium carbonate solution until no further diminution in the colour of the ether occurred. Evaporation of the whole mixture gave the sodium salt as an orange-red solid.

*Example 5*

An ointment was prepared by dissolving 2% by weight xanthoglabrol and 0.5% by weight neomycin sulphate in a "Vaseline" base. ("Vaseline" is a registered trademark.)

*Example 6*

An ointment was prepared by dissolving 2% by weight xanthoglabrol and 0.5% by weight neomycin sulphate in an ointment base comprising 8% by weight non-ionic emulsifying wax B.P.C. and 16% liquid paraffin in water.

*Example 7*

Ointments were prepared as in Examples 5 and 6 in which the neomycin sulphate was replaced by an equal amount of cetrimide.

*Example 8*

An emulsion was prepared by dissolving 0.5% by weight xanthoglabrol, 0.5% by weight hexachlorophene, 5% by weight "Lanbritol" (registered trademark), 10% by weight glycerol and 20% by weight polyethylene glycol in water.

*Example 9*

A lotion was prepared by dissolving 1% by weight xanthoglabrol, 1% by weight colourless tar fractions and 10% by weight polyethylene glycol (molecular weight 400) in water.

*Example 10*

A lotion was prepared by suspending 1% by weight xanthoglabrol, 0.5% by weight hydrocortisone alcohol, 0.5% by weight coal tar fractions and 10% by weight polyethylene glycol (molecular weight 600) in water.

*Example 11*

Ointments were prepared as in Examples 5 and 6 but omitting the neomycin sulphate.

*Example 12*

An emulsion was prepared as in Example 8 but omitting the hexachlorophene.

*Example 13*

Lotions were prepared as in Examples 9 and 10 but omitting the coal tar fractions.

*Example 14*

A suppository was prepared by dispersing 1% by weight xanthoglabrol, 2% by weight benzocaine and 5% by weight 2,4- and 4,4-(diacetoxydiphenyl methyl) pyridine in a suppository base (B.P.C.).

*Example 15*

A dusting powder was prepared by intimately mixing 1% by weight xanthoglabrol and 0.1% by weight diphenylhydramine hydrochloride in lactosum.

*Example 16*

An ointment was prepared with a base similar to that described in specification No. 26,332/57, now British Patent No. 843,134, containing 1% by weight xanthoglabrol, 2% by weight cinchocaine, 2% by weight amethocaine and 0.5% by weight neomycin sulphate. This ointment was found to be particularly useful for the treatment of mouth ulcers, dry sockets, gingivitis, pyorrhoea and inflammatory mouth conditions.

*Example 17*

An injection was prepared comprising 0.25 g. sodium salt of xanthoglabrol, 0.048 g. methyl p-hydroxybenzoate, 0.08 g. "Tween" (registered trademark), which is a wetting agent and 0.1 g. "Edipas" (registered trademark), which is an edible cellulose derivative and sufficient normal saline solution to make 20 ml.

*Example 18*

Tablets were prepared containing 0.1 g. xanthoglabrol in amylum.

*Example 19*

A vaginal pessary was prepared containing 1% by weight xanthoglabrol and 0.5% neomycin sulphate in an "Imhausen" base H pessary base ("Imhausen" is a registered trademark).

*Example 20*

An implant was prepared by fusion compression of 0.1 mg. xanthoglabrol.

What is claimed is:

1. Xanthoglabrol, an orange-colored solid which is an ether extract from water-precipitated warm-concentrated-hydrochloric-acid extract of powdered liquorice root.

2. A member selected from the group consisting of therapeutically useful acylated xanthoglabrol, therapeutically useful xanthoglabrol ester and therapeutically useful xanthoglabrol salt, xanthoglabrol being an orange-colored solid which is an ether extract from water-precipitated warm-concentrated-hydrochloric-acid extract of powdered liquorice root.

3. Therapeutically useful xanthoglabrol salts of organic bases, xanthoglabrol being an orange-colored solid which is an ether extract from water-precipitated warm-concentrated-hydrochloric-acid extract of powdered liquorice root.

4. The piperazine salt of xanthoglabrol, xanthoglabrol being an orange-colored solid which is an ether extract from water-precipitated warm-concentrated-hydrochloric-acid extract of powdered liquorice root.

5. The protamine salt of xanthoglabrol, xanthoglabrol being an orange-colored solid which is an ether extract from water-precipitated warm-concentrated-hydrochloric-acid extract of powdered liquorice root.

6. The N-methyl-glucamine salt of xanthoglabrol, xanthoglabrol being an orange-colored solid which is an ether extract from water-precipitated warm-concentrated-hydrochloric-acid extract of powdered liquorice root.

7. The sodium salt of xanthoglabrol, xanthoglabrol being an orange-colored solid which is an ether extract from water-precipitated warm-concentrated-hydrochloric-acid extract of powdered liquorice root.

8. Purine salt of xanthoglabrol, xanthoglabrol being an orange-colored solid which is an ether extract from water-precipitated warm-concentrated-hydrochloric-acid extract of powdered liquorice root.

9. Process for the production of xanthoglabrol, wherein an acetic acid mother liquor remaining after crystallisation of a crude salt of glycyrrhizin from an acetic acid extract of liquorice root is treated with a non-hydroxylic organic solvent, the precipitate so obtained freed from solvent, stirred with warm concentrated hydrochloric acid, water added and the total precipitate so obtained separated off, dried, extracted with ether and the ether finally removed, whereby xanthoglabrol is obtained as an orange-coloured solid.

10. Process according to claim 9, wherein the non-hydroxylic organic solvent is ether.

11. Process according to claim 10, wherein a chloroformic solution of the xanthoglabrol is subjected to chromatographic purification in a chromatographic column packed with a material selected from the group consisting of cellulose and silicic acid.

12. Process for the production of xanthoglabrol, wherein powdered liquorice root is heated with concentrated hydrochloric acid to form a water insoluble mixture and the resultant water-insoluble mixture is separated and extracted with ether, whereby a crude xanthoglabrol-glycyrrhetinic acid mixture remains behind.

13. Process according to claim 12, wherein the crude mixture is freed from glycyrrhetinic acid by extraction with cold ether.

14. Process according to claim 12, wherein the crude mixture is purified by means of chromatography.

15. Therapeutic compositions comprising as active ingredient xanthoglabrol and an inert carrier base, xanthoglabrol being an orange-colored solid which is an ether extract from water-precipitated warm-concentrated-hydrochloric-acid extract of powdered liquorice root.

16. Therapeutic compositions comprising xanthoglabrol, and inert carrier base and at least one other therapeutic agent, said xanthoglabrol being an orange-colored solid which is an ether extract from water-precipitated warm-concentrated-hydrochloric-acid extract of powdered liquorice root.

References Cited in the file of this patent

UNITED STATES PATENTS

| | | |
|---|---|---|
| 1,796,109 | Kayser et al. | Mar. 10, 1931 |
| 2,273,196 | Hesse | Feb. 17, 1942 |
| 2,410,949 | Karrer | Nov. 12, 1946 |
| 2,698,822 | Halpern et al. | Jan. 4, 1955 |

OTHER REFERENCES

Beaton: Chem. Abst., vol. 51, 1957, page 305–g.
Paris: Chem. Abst., vol. 50, 1956, page 6748H.